(12) United States Patent
Madan et al.

(10) Patent No.: US 10,922,188 B2
(45) Date of Patent: Feb. 16, 2021

(54) METHOD AND SYSTEM TO TAG AND ROUTE THE STRIPED BACKUPS TO A SINGLE DEDUPLICATION INSTANCE ON A DEDUPLICATION APPLIANCE

(71) Applicant: EMC IP Holding Company LLC, Hopkinton, MA (US)

(72) Inventors: Nitin Madan, Gurugram (IN); Srikant Viswanathan, Pune (IN); Kedar Sadanand Godbole, Pune (IN)

(73) Assignee: EMC IP Holding Company LLC, Hopkinton, MA (US)

(*) Notice: Subject to any disclaimer, the term of this patent is extended or adjusted under 35 U.S.C. 154(b) by 73 days.

(21) Appl. No.: 16/259,469

(22) Filed: Jan. 28, 2019

(65) Prior Publication Data

US 2020/0241971 A1 Jul. 30, 2020

(51) Int. Cl.
*G06F 11/14* (2006.01)
*G06F 3/06* (2006.01)
*H04L 29/08* (2006.01)

(52) U.S. Cl.
CPC ........ *G06F 11/1453* (2013.01); *G06F 3/0641* (2013.01); *G06F 11/1451* (2013.01); *G06F 11/1464* (2013.01); *G06F 11/1469* (2013.01); *H04L 67/1029* (2013.01)

(58) Field of Classification Search
None
See application file for complete search history.

(56) References Cited

U.S. PATENT DOCUMENTS

| | | | | |
|---|---|---|---|---|
| 8,074,043 | B1* | 12/2011 | Zeis | G06F 16/1748 711/171 |
| 9,384,200 | B1* | 7/2016 | Batchu | G06F 11/1435 |
| 2005/0216669 | A1* | 9/2005 | Zhu | G06F 3/064 711/118 |
| 2008/0270729 | A1* | 10/2008 | Reddy | G06F 16/285 711/170 |
| 2012/0117028 | A1 | 5/2012 | Gold et al. | |
| 2012/0158672 | A1* | 6/2012 | Oltean | G06F 16/13 707/692 |
| 2012/0159098 | A1* | 6/2012 | Cheung | G06F 12/0261 711/162 |
| 2012/0233417 | A1* | 9/2012 | Kalach | G06F 3/0641 711/162 |
| 2013/0018855 | A1* | 1/2013 | Eshghi | G06F 11/1453 707/692 |
| 2018/0011767 | A1 | 1/2018 | Kochunni | |

* cited by examiner

*Primary Examiner* — Kaushikkumar M Patel
(74) *Attorney, Agent, or Firm* — Chamberlain, Hrdlicka, White, Williams & Aughtry

(57) ABSTRACT

A method for managing backups includes receiving, via a first backup stream, first data associated with a first tagged backup stripe, wherein the first tagged backup stripe is associated with a first routing tag, directing, based on the first routing tag, the first data to a first backup instance, receiving, via a second backup stream, second data associated with a second tagged backup stripe, wherein the second tagged backup stripe is associated with the first routing tag, directing, based on the first routing tag, the second data to the first backup instance, and performing, in the first backup instance, a deduplication operation on the first data and the second data.

20 Claims, 6 Drawing Sheets

METHOD AND SYSTEM TO TAG AND ROUTE THE STRIPED BACKUPS TO A SINGLE DEDUPLICATION INSTANCE ON A DEDUPLICATION APPLIANCE

BACKGROUND

Computing devices generate and storage large amounts of data. Over time, the data that is stored may be transferred to a remote storage system. Depending on how the data is initially stored by the computing device, it may be difficult to efficiently manage the stored data and to transfer the stored data to the remote storage system.

SUMMARY

In general, in one aspect, embodiments of the invention relate to a method for managing backups in accordance with one or more embodiments of the invention. The method includes receiving, via a first backup stream, first data associated with a first tagged backup stripe, wherein the first tagged backup stripe is associated with a first routing tag, directing, based on the first routing tag, the first data to a first backup instance, receiving, via a second backup stream, second data associated with a second tagged backup stripe, wherein the second tagged backup stripe is associated with the first routing tag, directing, based on the first routing tag, the second data to the first backup instance, and performing, in the first backup instance, a deduplication operation on the first data and the second data.

In one aspect, a non-transitory computer readable medium in accordance with one or more embodiments of the invention includes computer readable program code, which when executed by a computer processor enables the computer processor to perform a method for managing backups. The method includes receiving, via a first backup stream, first data associated with a first tagged backup stripe, wherein the first tagged backup stripe is associated with a first routing tag, directing, based on the first routing tag, the first data to a first backup instance, receiving, via a second backup stream, second data associated with a second tagged backup stripe, wherein the second tagged backup stripe is associated with the first routing tag, directing, based on the first routing tag, the second data to the first backup instance, and performing, in the first backup instance, a deduplication operation on the first data and the second data.

In one aspect, a system for managing backups includes a processor, a database, and memory comprising instructions which when executed by the processor perform a method. The method includes receiving, via a first backup stream, first data associated with a first tagged backup stripe, wherein the first tagged backup stripe is associated with a first routing tag, directing, based on the first routing tag, the first data to a first backup instance, receiving, via a second backup stream, second data associated with a second tagged backup stripe, wherein the second tagged backup stripe is associated with the first routing tag, directing, based on the first routing tag, the second data to the first backup instance, and performing, in the first backup instance, a deduplication operation on the first data and the second data.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method and system for managing backup transfer processes. More specifically, embodiments of the invention relate to a method for identifying backups that have been striped and sending backup stripes associated with the same backup to the same deduplication instance. Embodiments of the invention assign the same routing tag all backup stripes of a backup. A backup storage system storing the backup stripes uses the routing tag to identify a deduplication instance in which to store the backup stripes.

Figure 1:
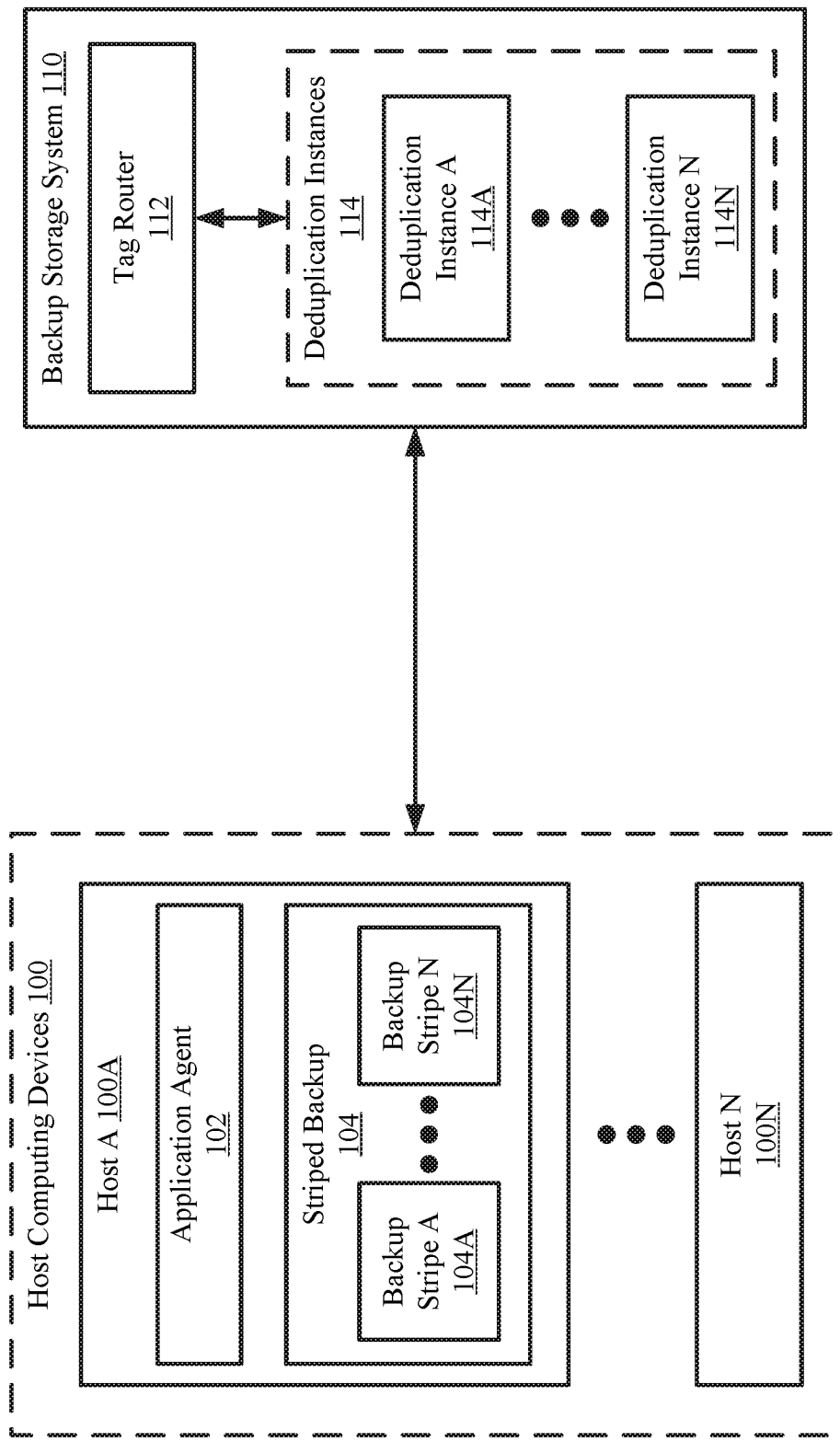
FIG. 1 shows a diagram of a system in accordance with one or more embodiments of the invention.

FIG. 1 shows an example system in accordance with one or more embodiments of the invention. The system includes any number of host computing devices (100) and a backup storage system (110). Each component of the system of FIG. 1 may be operably connected via any combination of wired and/or wireless connections. Each component of the system is discussed below.

In one or more embodiments of the invention, the host computing devices (100) include a number of hosts (100A, 100N). The hosts (100A, 100N) may include applications such as, for example, databases, instances of databases, email servers, or other types of applications without departing from the invention. The databases, or other types of applications, may be backed up by generating a striped backup and sending the striped backup to the backup storage system (110) to be stored. The hosts (100A, 100N) may generate other types of backups (i.e., non-striped backups) to be sent to the backup storage system (110) without departing from the invention.

In one or more embodiments of the invention, a host uses an application agent to perform the backup of databases, or the other types of applications. The application agent may identify a database to be backed up and perform methods for generating a backup of the database and sending the backup to the backup storage system (110). In one or more embodiments of the invention, the application agent performs the methods for generating a backup as illustrated in FIG. 2B.

Figure 2A:
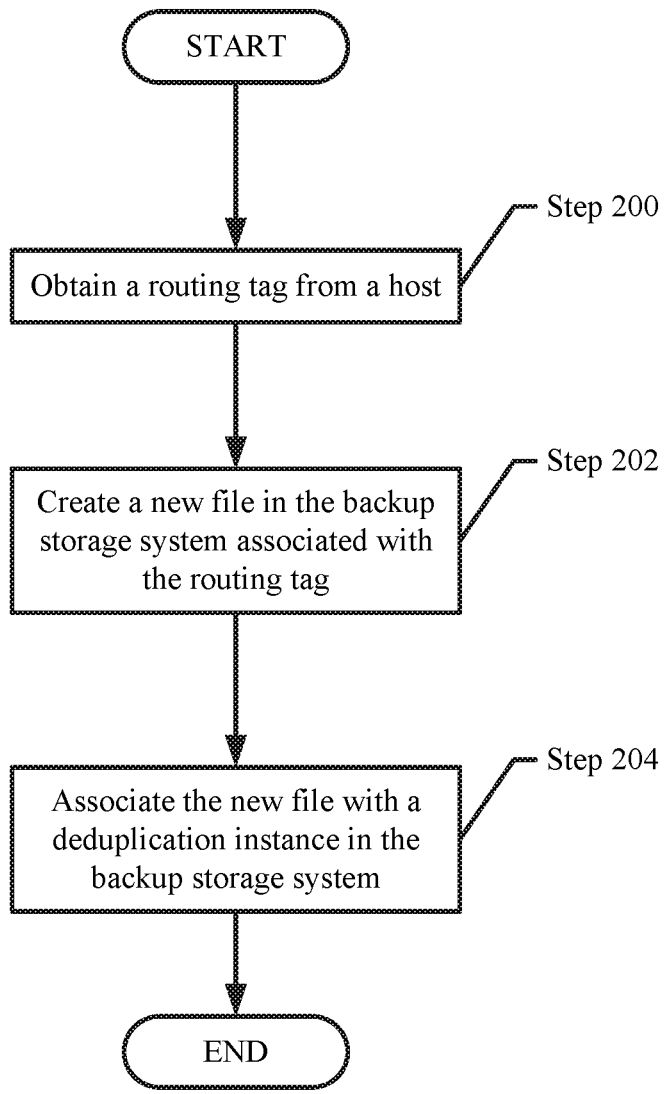
FIG. 2A shows a flowchart for determining a deduplication instance for a backup in accordance with one or more embodiments of the invention.
Figure 2B:
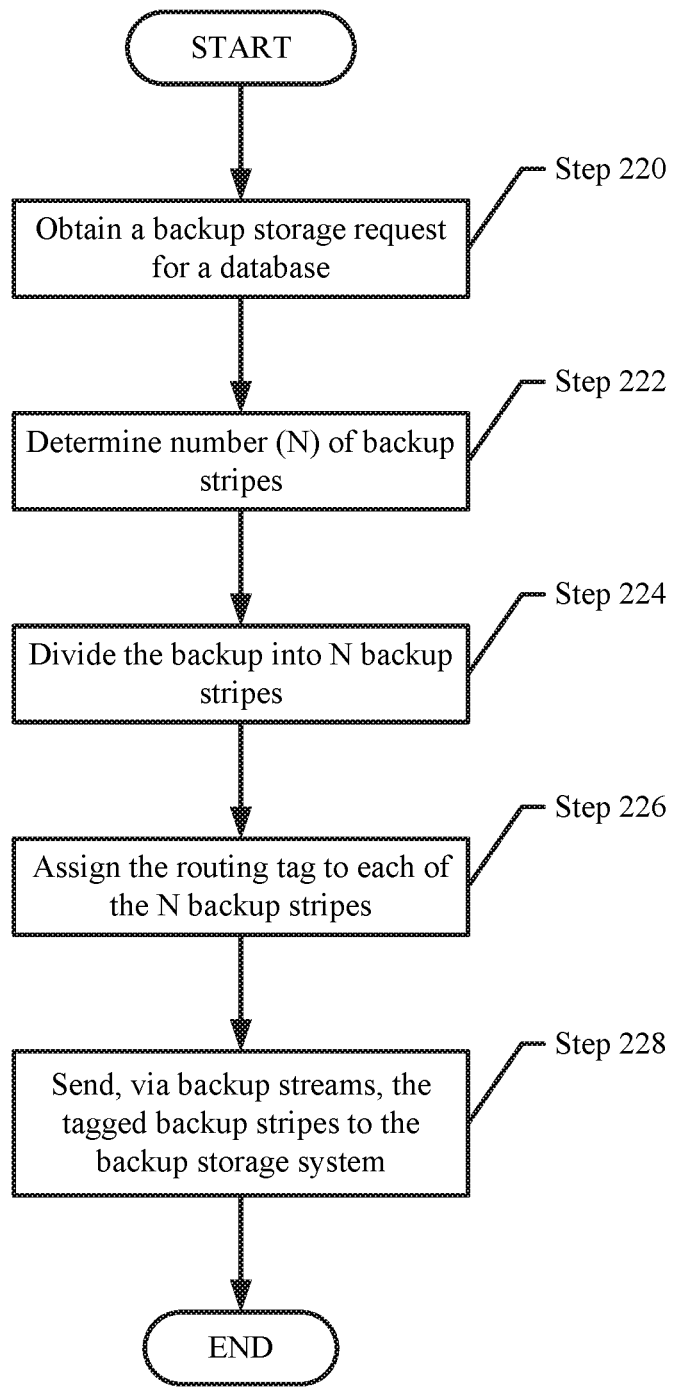
FIG. 2B shows a flowchart for generating a striped backup in accordance with one or more embodiments of the invention.

In one or more embodiments of the invention, the application agent is implemented as computer instructions, e.g., computer code, stored on a persistent storage that, when executed by a processor of the application agent, cause the host to provide the aforementioned functionality of the application agent described throughout this application and/or all, or a portion thereof, of the method illustrated in FIG. 2B.

In one or more embodiments of the invention, the striped backup is a backup of a database stored in a host. The striped backup may include any number of backup stripes. Each backup stripe may include metadata that describes data associated with the backup stripe. In one or more embodiments of the invention, the metadata includes a routing tag that associates each backup stream to the striped backup. In other words, each backup stream associated with the same striped backup may include an identical routing tag in its metadata.

Figure 4:
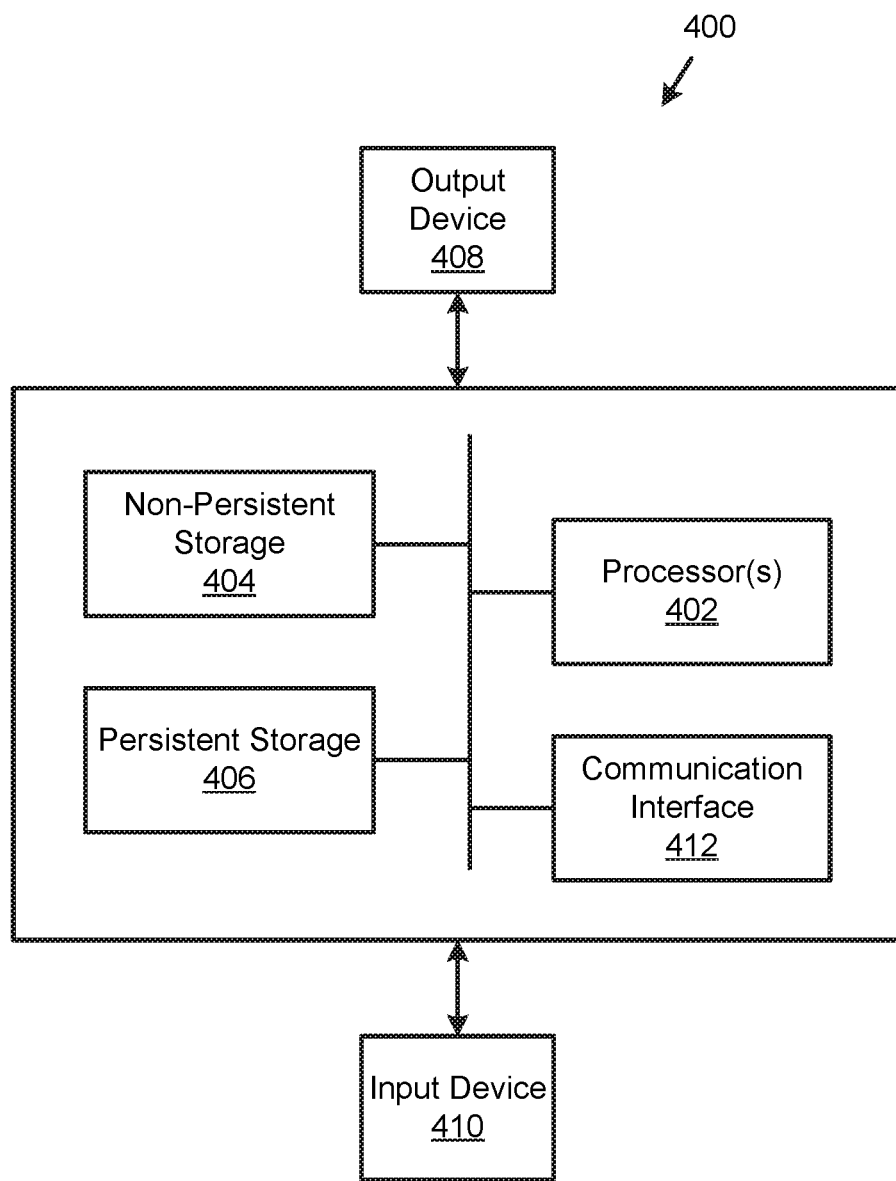
FIG. 4 shows a diagram of a computing device in accordance with one or more embodiments of the invention.

In one or more embodiments of the invention, the hosts (100A, 100N) are implemented as computing devices (see e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the host described throughout this application and/or all, or a portion thereof, of the methods illustrated in FIG. 2B.

In one or more embodiments of the invention, the each host is implemented as a logical device. The logical device may utilize the computing resources of any number of computing devices and thereby provide the functionality of the host described throughout this application and/or all, or a portion thereof, of the methods illustrated in FIG. 2B.

In one or more embodiments of the invention, the backup storage system (110) stores backups obtained from the host computing devices (100). The backup storage system (110) stores the backups in deduplication instances. The backup storage system (110) may perform methods to determine a deduplication instance in which to store each backup. Further, the backup storage system (110) may perform deduplication operations on backups stored on each deduplication instance to reduce the total amount of data stored in each deduplication instance.

In one or more embodiments of the invention, the backup storage system (110) obtains a backup as backup stripes. The backup storage system (110) may use a tag router (112) of the backup stripes to identify a deduplication instance in which to store the backup stripes. The tag router (112) may identify the deduplication instance using a routing tag obtained from the backup stripes. In one or more embodiments of the invention, the tag router (112) identifies a deduplication instance in which to store the backup stripes by performing methods illustrated in FIGS. 2A and 2C.

In one or more embodiments of the invention, the backup storage system (110) may also obtain a backup that does not include a routing tag. In such scenarios, the tag router (112) performs a load balancing operation on the backups to determine a deduplication instance in which to route the backup. In one or more embodiments of the invention, the load balancing operation includes identifying CPU usage of the deduplication instances (114) and selecting the deduplication instance in which there is the least CPU load. Additionally, a load balancing operation may refer to identifying other loads applied to the deduplication instances (e.g., 10 loads, network loads, etc.).

In one or more embodiments of the invention, the tag router (112) is implemented as computer instructions, e.g., computer code, stored on a persistent storage that, when executed by a processor of the backup storage system (110), cause the backup storage system (110) to provide the aforementioned functionality of the tag router (112) described throughout this application and/or all, or a portion thereof, of the method illustrated in FIGS. 2A and 2B.

In one or more embodiments of the invention, the tag router (112) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the tag router (112) described throughout this application and/or all or a portion of the methods illustrated in FIGS. 2A and 2C.

In one or more embodiments of the invention, each deduplication instance (114A, 114N) stores any number of backups. The backups may be striped backups (e.g., 104) and/or non-striped backups. The backup storage system (110) may perform deduplication operations on the backups stored in each deduplication instance.

As used herein, a deduplication operation refers to methods of storing only portions of files (e.g., backup stripes) that are not already stored in the persistent storage. For example, when multiple versions of a large file, having only minimal differences between each of the versions, are stored without deduplication, storing each version will require approximately the same amount of storage space of a persistent storage. In contrast, when the multiple versions of the large file are stored with deduplication, only the first version of the multiple versions stored will require a substantial amount of storage. Once the first version is stored in the persistent storage, the subsequent versions of the large file subsequently stored will be de-duplicated before being stored in the persistent storage resulting in much less storage space of the persistent storage being required to store the subsequently stored versions when compared to the amount of storage space of the persistent storage required to store the first stored version.

In one or more embodiments of the invention, the backup storage system (110) is implemented as a computing device (see e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup storage system (110) described throughout this application.

In one or more embodiments of the invention, the backup storage system (110) is implemented as a logical device. The logical device may utilize the computing resources of any number of computing devices and thereby provide the functionality of the backup storage system (110) described throughout this application.

Figure 2C:
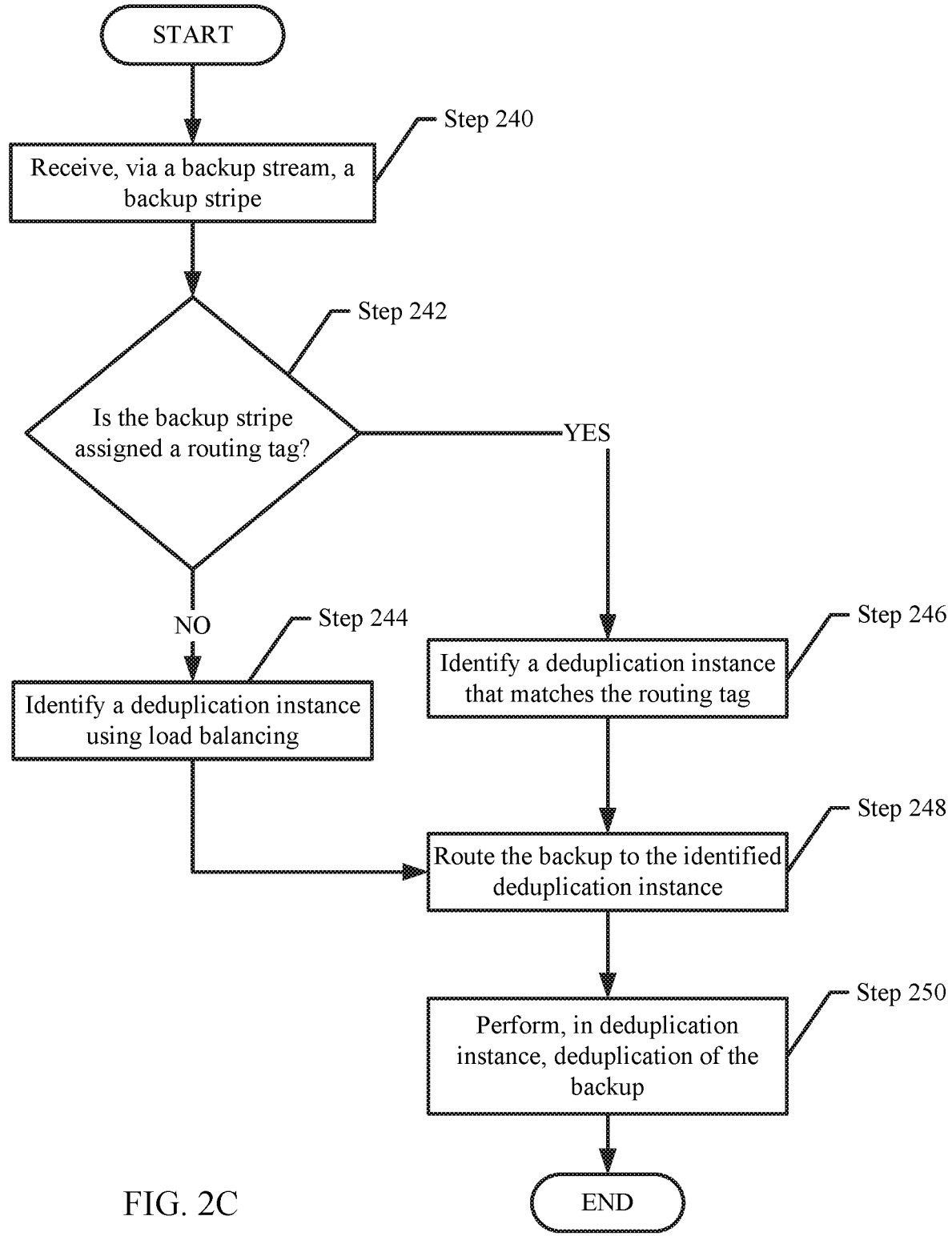
FIG. 2C shows a flowchart for storing a backup in a backup storage system in accordance with one or more embodiments of the invention.

FIGS. 2A-2C show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2C may be performed in parallel with any other steps shown in FIGS. 2A-2C without departing from the scope of the invention.

FIG. 2A shows a flowchart for determining a deduplication instance for a backup in accordance with one or more embodiments of the invention. The method shown in FIG. 2A may be performed by, for example, a tag router (112, FIG. 1). Other components of the system illustrated in FIG. 1 may perform the method of FIG. 2A without departing from the invention.

Turning to FIG. 2A, in step 200, a routing tag is obtained from a host. The routing tag may be associated with metadata of a backup stripe. The tag router may obtain the routing tag from a host requesting to store a striped backup in the backup storage system hosting the tag router.

In step 202, a new file in the backup storage system associated with the routing tag is created. The new file may be used to reference data associated with the routing tag. The data may be streamed to the backup storage system at a later point in time. In other words, the new file may be empty until the data associated with the file is stored in the backup storage system.

In step 204, the new file is associated with a deduplication instance in the backup storage system. In one or more embodiments of the invention, the tag router determines a deduplication instance to associate the new file by performing a load balancing operation. The tag router may identify loads (e.g., CPU loads) applied to each deduplication instance and select a deduplication instance on which a minimum load is present. In this manner, the tag router attempts to balance the loads applied to the deduplication instances should additional routing tags for additional striped backups be obtained while the tag router performs the methods of FIGS. 2A and 2C on a backup. The tag router may use other methods for determining a deduplication instance with which to associate the routing tag without departing from the invention.

In one or more embodiments of the invention, the routing tag is included in a routing table that stores active routing tags for backup stripes obtained by the tag router. The routing table may be, for example, a hash table that includes entries for each routing tag and a corresponding key that specifies a deduplication instance in the backup system. Other data structures may be used without departing from the invention.

FIG. 2B shows a flowchart for generating a striped backup in accordance with one or more embodiments of the invention. The method shown in FIG. 2B may be performed by a host (e.g., 100A, 100N, FIG. 1). Other components of the system illustrated in FIG. 1 may perform the method of FIG. 2B without departing from the invention.

In step 220, a backup storage request for a database is obtained. In one or more embodiments of the invention, the backup storage request is sent by a computing device (e.g., a client) requesting to store a backup of a database in a backup storage system. The backup storage request may include requesting the host to stripe the backup prior to sending the backup to the backup storage system.

In step 222, a number (N) of backup stripes is determined. In one or more embodiments of the invention, the number of backup stripes is determined based on a size of the backup. Each backup stripe may be of a predetermined size (e.g., 1 MB), and the number of backup stripes may depend on how many backup stripes of the predetermined size will account for all of the data in the backup. Said another way, the number of backup stripes may be determined by dividing the total size of the backup by the predetermined size. Other methods for determining N may be used without departing from the invention.

In step 224, the backup is divided into N backup stripes. In one or more embodiments of the invention, the backup is divided by identifying an offset of the data in the backup and assigning an amount of data to a backup stripe based on the predetermined size of the backup stripe. In one or more embodiments of the invention, the resulting size may be different for each backup stripe without departing from the invention.

In step 226, the routing tag is assigned to each of the N backup stripes. In one or more embodiments of the invention, the routing tag is assigned by adding the routing tag to metadata associated with each backup stripe, making the backup stripes tagged backup stripes. In one or more embodiments of the invention, the routing tag assigned to the tagged backup stripes is identical to the routing tag obtained by the backup storage device in step 200.

In step 228, the tagged backup stripes are sent to the backup storage system via backup streams. In one or more embodiments of the invention, the backup streams transmit data in in parallel to the backup storage device, where each backup stream is associated with a tagged backup stripe. As a result, multiple tagged backup stripes may be transmitted in parallel to the backup storage device.

FIG. 2C shows a flowchart for storing a backup in a backup storage system in accordance with one or more embodiments of the invention. The method shown in FIG. 2C may be performed by, for example, a tag router of a backup storage system (112, FIG. 1). Other components of the system illustrated in FIG. 1 may perform the method of FIG. 2C without departing from the invention.

In step 240, a backup stripe is received via a backup stream. In one or more embodiments of the invention, the backup stripe is received from a host requesting to store the backup stripe in the backup storage system.

In one or more embodiments of the invention, the backup stripe includes a routing tag assigned to the backup stripe. In other embodiments of the invention, the backup received is a non-tagged backup stripe. A non-tagged backup stripe may be a backup of a database that does not have a routing tag associated with it. In such a scenario, the non-tagged backup stripe may not be associated with other backups and, therefore, the deduplication instance in which the non-tagged backup is placed does not affect the deduplication of other backups in the backup storage system.

In step 242, a determination is made about whether the backup stripe is assigned a routing tag. If the backup stripe is assigned a routing tag, the method proceeds to step 246; otherwise, the method proceeds to step 244.

In step 244, a deduplication instance is identified using load balancing. In one or more embodiments of the invention, the tag router, after identifying that the backup stripe obtained in step 240 is a non-tagged backup stripe, may apply a load balancing operation on the deduplication instances running on the backup storage system to identify the deduplication instance in which to store the backup. The load balancing operation may include identifying loads applied to deduplication instances and determining a deduplication instance to which a minimum load is applied. Other methods for determining where to store a non-tagged backup stripe may be used without departing from the invention.

In step 246, a deduplication instance is identified that matches the routing tag. In one or more embodiments of the invention, the deduplication instance is identified by searching a routing table (e.g., a hash table) in which the routing tag is stored and identifying the deduplication instance associated with the routing tag.

In step 248, the backup stripe is routed to the identified deduplication instance. In one or more embodiments of the invention, the backup stripe is routed to computing device(s) that are utilized to perform the functionality of the identified deduplication instance. The computing device(s) may, in turn, store the backup.

In step 250, a deduplication is performed of the backup in the identified deduplication instance. In one or more embodiments of the invention, the deduplication operation performed on the backup is a method of removing data that already exists in other backups. The backup (e.g., the backup stripe) may be analyzed with other backups (or backup stripes) in the deduplication instance to identify repeating data. The repeating data may be removed from the backup (or backup stripes). The deduplication performed in step 250 is on a per-deduplication instance basis. As a result, the deduplication is only performed on the backup stripes (which may or may not be tagged backup stripes) in the deduplication instance.

In one embodiments of the invention, once the tag router performs steps 240, 242, and 246 for a given backup stripe (i.e., determines to which deduplication instance to route the backup stripe), only steps 248-250 are performed on the remaining data of the backup stripe. Said another way, steps 240, 242, and 246 for a given backup stripe occur when the initial data associated with the backup stripe is received but do not need to be performed each time new data associated with the backup stripe is received; rather, the subsequently received data associated with the backup stripe is directly stored in the previously determined deduplication instance.

In one embodiment of the invention, the routing tags associated with each of the backup stripes received by the backup storage system are stored by the backup storage system. The aforementioned information may be stored as metadata by the tag router or by another component in the backup storage system. This metadata may be used by other backup storage systems. For example, the striped backups may be stored in a first backup storage system in accordance with the methods described in above in FIGS. 2A-2C. At a later point in time, a second copy of the backup may be created by generating tagged backups stripes using the aforementioned metadata and then transmitting, from the first backup storage system, tagged backup stripes to a second backup storage system that includes its own tag router. The tag router in the second backup storage system may then perform the method shown in FIG. 2C to store the received backup stripes across its deduplication instances.

EXAMPLE

Figure 3:
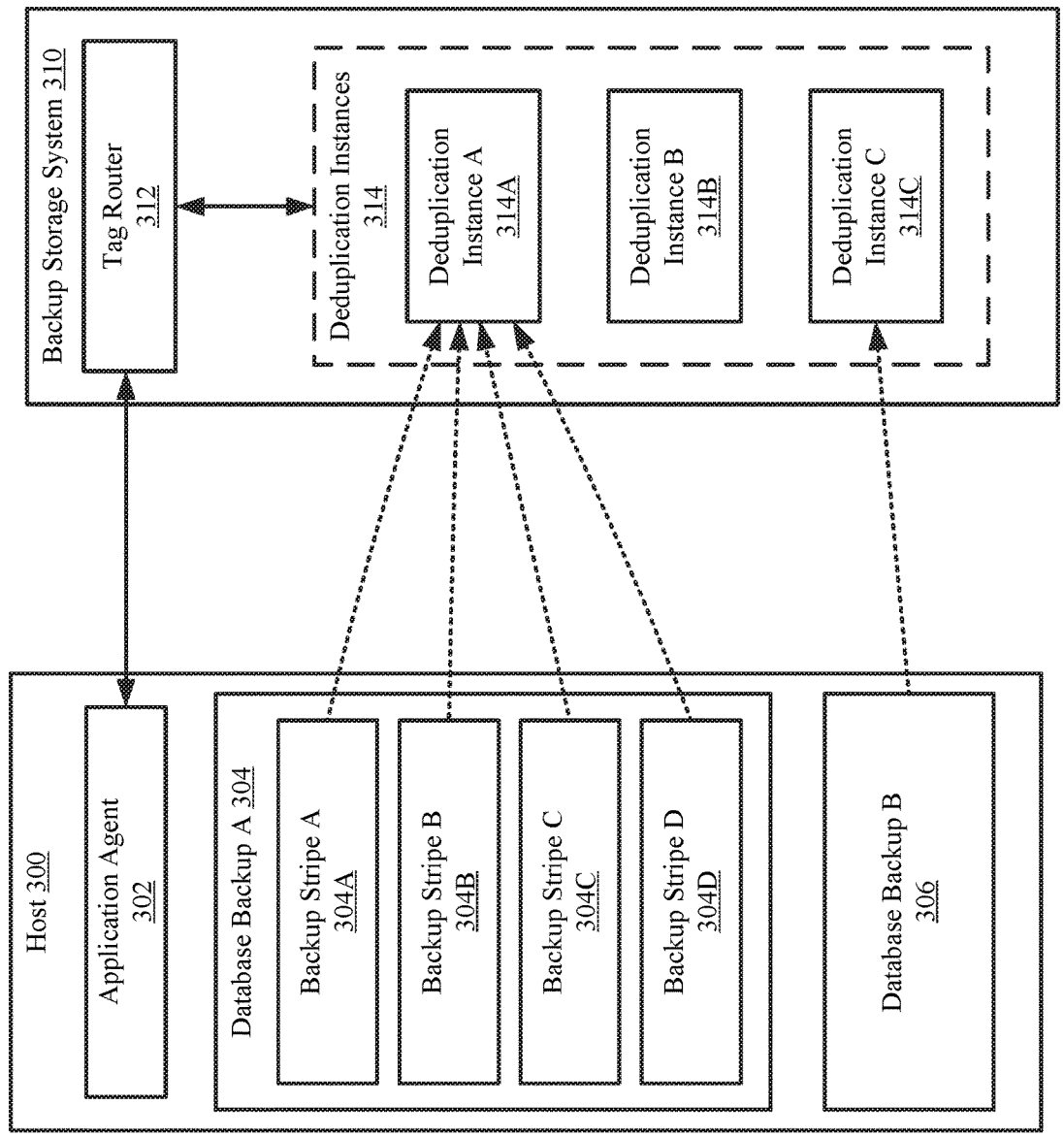
FIG. 3 show an example in accordance with one or more embodiments of the invention.

To further clarify embodiments of the invention, the following section describes an example. The example is not intended to limit the invention. The example may be illustrated in FIG. 3. Turning to the example, a backup storage request for a database has been obtained by a host (300). The backup storage request may specify that the backup be stored in a backup storage system (310). The backup storage system (310) may include a tag router (312) and three deduplication instances (314A, 314B, 314C). The host (300) includes an application agent (302) that performs the method of FIG. 2B to generate a striped backup (304) of the database. The striped backup (i.e., database backup A) (304) may be striped to include four backup stripes (304A, 304B, 304C, 304D) based on a size of the backup and a predetermined size of each backup stripe. Database backup A (304) may be 400 MB in size and each backup stripe may be required to be 100 MB in size. Subsequently, the database backup (304) is striped into four backup stripes (304A, 304B, 304C, 304D). A routing tag may be associated with the backup stripes (304A, 304B, 304C, 304D) by including it in the metadata of each backup stripe.

The application agent (302) may request to store the backup in a deduplication instance (314A, 314B, 314C) of a backup storage system (310). The application agent (302) may send the routing tag to the tag router (312) to have a file generated for the backup stripes (304A, 304B, 304C, 304D). The backup storage system (310) may then perform the method of FIG. 2A to determine a deduplication instance (314A, 314B, 134C) in which to store the database backup (304). Subsequently, the backup storage system (310) selects deduplication instance A (314A) as the deduplication instance in which to store the backup stripes (304A, 304B, 304C, 304D). The tag router (312) may, in turn, store a routing table (e.g., a hash table) that references the routing tag and the corresponding deduplication instance (314A). In this manner, the tag router (312) will route backup stripes (304A, 304B, 304C, 304D) to the deduplication instance (314A) as the backup storage system (310) obtains the backup stripes (304A, 304B, 304C, 304D).

Following the method of FIG. 2C, the tag router (312) receives a backup stripe (304A), identifies the deduplication instance (314A) to store the backup stripe (304A), and stores the backup stripe (304A) accordingly. The tag router (312) may obtain a second backup stripe (304B), identify the deduplication instance (314A) to store the second backup stripe (304B), and store the second backup stripe (304B) accordingly. Following the storage of the second backup stripe (304B), the tag router (312) may perform a deduplication operation on the deduplication instance (314A) to reduce the amount of data between backup stripe A (304A) and backup stripe B (304B).

The process of identifying deduplication instance A (314A), storing a backup stripe (304A, 304B, 304C, 304D) in the identified deduplication instance (314A), and deduplicating the backup stripe (304A, 304B, 304C, 304D) may be repeated for backup stripes C and D (304C, 304D). In this manner, when the deduplication instance (314A) is replicated to a separate backup storage system, the deduplication of data in database backup A (304) is maintained throughout the replication process and throughout the backup process.

At any point during the data transfer of the backup stripes (304A, 304B, 304C, 304D) to the backup storage system (310), a second request to store a second database backup (i.e., database backup B) (306) without tagging is issued. The host (300) may send the database backup (306) to the backup storage system (310). The tag router (312) may perform the methods of FIG. 2C to store database backup B (306). Because database backup B (306) is not tagged, a routing tag is not assigned to the backup (306). In this case, the tag router may perform a load balancing operation on the backup (306) to determine a deduplication instance (314A, 314B, 314C) in which to store the backup (306). The tag router (312) may select deduplication instance C (314C) by determining that deduplication instance C (314C) is incurring the smallest load at the time of the data transfer of the database backup (306).

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention may improve the efficiency of storing data on a storage system. The efficiency may be improved by modifying a method for obtaining a backup. The method may be modified by identifying whether the backup is associated with other obtained backups and storing the backup in an identical pool as the other obtained backups. The modified method may allow the storage system storing the backups to perform deduplication operations on the backups that would otherwise not be able to perform had the backups been stored in different pools (i.e., deduplication instances).

By allowing deduplication operations to be performed on the backups, embodiments of the invention reduce the amount of data transferred during replication of the backups to other backup storage systems. This may reduce the overall network traffic between the backup storage systems.

Thus, embodiments of the invention may address the problem of inefficient use of computing resources. This problem arises due to the technological nature of the environment in which backup policies are implemented.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing backups, the method comprising:
   receiving, by a tag router and via a first backup stream, first data associated with a first tagged backup stripe,
      wherein the first tagged backup stripe is associated with a first routing tag,
      wherein a host generated a first backup stripe and second backup stripe from a backup;
      wherein the host assigned the first routing tag to the first backup stripe to generate the first tagged backup stripe based on an association of the first backup stripe to the backup,
      wherein the host assigned the first routing tag to the second backup stripe to generate a second tagged backup stripe based on an association of the second backup stripe to the backup, and
      wherein the host initiated transmission of the first tagged backup stripe to the tag router;

directing, by the tag router and based on the first routing tag, the first data to a first backup instance;
receiving, by the tag router and via a second backup stream, second data associated with the second tagged backup stripe wherein the host initiated transmission of the second tagged backup stripe to the tag router;
directing, by the tag router and based on the first routing tag, the second data to the first backup instance; and
performing, after the first data and the second data are stored in the first backup instance and in the first backup instance, a first deduplication operation on the first data and the second data,
wherein a backup storage system comprises the tag router and the first backup instance,
wherein the host is operatively connected to the backup storage system.

2. The method of claim 1, further comprising:
receiving, via a third backup stream, third data associated with a third tagged backup stripe, wherein the third tagged backup stripe is associated with a second routing tag; and
directing, based on the second routing tag, the third data to a second backup instance.

3. The method of claim 2, further comprising:
performing, in the second backup instance, a second deduplication operation on the third data,
wherein the second deduplication operation is performed independently of the first deduplication operation.

4. The method of claim 1, further comprising:
receiving, via a third backup stream, third data associated with a non-tagged backup stripe; and
directing, based on a load balancing operation, the third data to a second backup instance.

5. The method of claim 1, further comprising:
receiving, via a third backup stream, third data associated with a non-tagged backup stripe; and
directing, based on a load balancing operation, the third data to the first backup instance.

6. The method of claim 1, further comprising:
prior to receiving the first data:
obtaining the first routing tag; and
associating the first routing tag with the first backup instance.

7. The method of claim 1, wherein the first routing tag is stored with the first data in the first backup instance.

8. A non-transitory computer readable medium comprising computer readable program code, which when executed by a computer processor enables the computer processor to perform a method, the method comprising:
receiving, by a tag router and via a first backup stream, first data associated with a first tagged backup stripe, wherein the first tagged backup stripe is associated with a first routing tag,
wherein a host generated a first backup stripe and second backup stripe from a backup;
wherein the host assigned the first routing tag to the first backup stripe to generate the first tagged backup stripe based on an association of the first backup stripe to the backup,
wherein the host assigned the first routing tag to the second backup stripe to generate a second tagged backup stripe based on an association of the second backup stripe to the backup, and
wherein the host initiated transmission of the first tagged backup stripe to the tag router;
directing, by the tag router and based on the first routing tag, the first data to a first backup instance;
receiving, by the tag router and via a second backup stream, second data associated with the second tagged backup stripe wherein the host initiated transmission of the second tagged backup stripe to the tag router;
directing, by the tag router and based on the first routing tag, the second data to the first backup instance; and
performing, after the first data and the second data are stored in the first backup instance and in the first backup instance, a first deduplication operation on the first data and the second data,
wherein a backup storage system comprises the tag router and the first backup instance,
wherein the host is operatively connected to the backup storage system.

9. The non-transitory computer readable medium of claim 8, further comprising:
receiving, via a third backup stream, third data associated with a third tagged backup stripe, wherein the third tagged backup stripe is associated with a second routing tag; and
directing, based on the second routing tag, the third data to a second backup instance.

10. The non-transitory computer readable medium of claim 9, further comprising:
performing, in the second backup instance, a second deduplication operation on the third data,
wherein the second deduplication operation is performed independently of the first deduplication operation.

11. The non-transitory computer readable medium of claim 8, further comprising:
receiving, via a third backup stream, third data associated with a non-tagged backup stripe; and
directing, based on a load balancing operation, the third data to a second backup instance.

12. The non-transitory computer readable medium of claim 8, further comprising:
receiving, via a third backup stream, third data associated with a non-tagged backup stripe; and
directing, based on a load balancing operation, the third data to the first backup instance.

13. The non-transitory computer readable medium of claim 8, further comprising:
prior to receiving the first data:
obtaining the first routing tag; and
associating the first routing tag with the first backup instance.

14. The non-transitory computer readable medium of claim 8, wherein the first routing tag is stored with the first data in the first backup instance.

15. A system, comprising:
a processor;
a database;
memory comprising instructions which when executed by the processor perform a method, the method comprising:
receiving, by a tag router and via a first backup stream, first data associated with a first tagged backup stripe, wherein the first tagged backup stripe is associated with a first routing tag,
wherein a host generated a first backup stripe and second backup stripe from a backup;
wherein the host assigned the first routing tag to the first backup stripe to generate the first tagged backup stripe based on an association of the first backup stripe to the backup,
wherein the host assigned the first routing tag to the second backup stripe to generate a second tagged backup stripe based on an association of the second backup stripe to the backup, and
wherein the host initiated transmission of the first tagged backup stripe to the tag router;
directing, by the tag router and based on the first routing tag, the first data to a first backup instance;
receiving, by the tag router and via a second backup stream, second data associated with the second tagged backup stripe, wherein the host initiated transmission of the second tagged backup stripe to the tag router;
directing, by the tag router and based on the first routing tag, the second data to the first backup instance; and
performing, after the first data and the second data are stored in the first backup instance and in the first backup instance, a first deduplication operation on the first data and the second data,
wherein the system comprises the tag router and the first backup instance,
wherein the host is operatively connected to the system.

16. The system of claim 15, wherein the method further comprises:
receiving, via a third backup stream, third data associated with a third tagged backup stripe, wherein the third tagged backup stripe is associated with a second routing tag; and
directing, based on the second routing tag, the third data to a second backup instance.

17. The system of claim 16, wherein the method further comprises:
performing, in the second backup instance, a second deduplication operation on the third data,
wherein the second deduplication operation is performed independently of the first deduplication operation.

18. The system of claim 15, wherein the method further comprises:
receiving, via a third backup stream, third data associated with a non-tagged backup stripe; and
directing, based on a load balancing operation, the third data to a second backup instance.

19. The system of claim 15, wherein the method further comprises:
receiving, via a third backup stream, third data associated with a non-tagged backup stripe; and
directing, based on a load balancing operation, the third data to the first backup instance.

20. The system of claim 15, wherein the method further comprises:
prior to receiving the first data:
obtaining the first routing tag; and
associating the first routing tag with the first backup instance.

* * * * *